United States Patent
Ehsani et al.

(10) Patent No.: US 10,161,261 B2
(45) Date of Patent: Dec. 25, 2018

(54) DETECTING BLADE STRUCTURE ABNORMALITIES

(71) Applicant: VESTAS WIND SYSTEMS A/S, Aarhus N (DK)

(72) Inventors: Saed Ehsani, Aarhus (DK); Erik Carl Lehnskov Miranda, Randers SV (DK); Ib Svend Olesen, Randers (DK); Martin Møller Sørensen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 279 days.

(21) Appl. No.: 14/763,648

(22) PCT Filed: Feb. 14, 2013

(86) PCT No.: PCT/DK2013/050038
§ 371 (c)(1),
(2) Date: Jul. 27, 2015

(87) PCT Pub. No.: WO2014/124643
PCT Pub. Date: Aug. 21, 2014

(65) Prior Publication Data
US 2015/0354402 A1   Dec. 10, 2015

(51) Int. Cl.
*F01D 21/00* (2006.01)
*F01D 21/14* (2006.01)
*F03D 17/00* (2016.01)

(52) U.S. Cl.
CPC .......... *F01D 21/003* (2013.01); *F01D 21/14* (2013.01); *F03D 17/00* (2016.05); *F05B 2270/331* (2013.01); *F05B 2270/332* (2013.01); *F05B 2270/708* (2013.01)

(58) Field of Classification Search
CPC .............................. F01D 21/003; F01D 21/14
USPC ........................................................... 702/90
See application file for complete search history.

(56) References Cited

U.S. PATENT DOCUMENTS

2008/0206052 A1 * 8/2008 Volkmer ................. F03D 17/00
                                                                    416/61
2009/0319199 A1   12/2009 Volkmer

FOREIGN PATENT DOCUMENTS

WO        2006/012827 A1    2/2006

OTHER PUBLICATIONS

International Search Report for PCT/DK2013/050038, dated Oct. 30, 2013.

* cited by examiner

*Primary Examiner* — Anthony Ho
(74) *Attorney, Agent, or Firm* — Patterson + Sheridan, LLP

(57) ABSTRACT

To identify abnormal behavior in a turbine blade, a failure detection system generates a "fingerprint" for each blade on a turbine. The fingerprint may be a grouping a dynamic, physical characteristics of the blade such as its mass, strain ratio, damping ratio, and the like. While the turbine is operating, the failure detection system receives updated sensor information that is used to determine the current characteristics of the blade. If the current characteristics deviate from the characteristics in the blade's fingerprint, the failure detection system may compare the characteristics of the blade that deviates from the fingerprint to characteristics of another blade on the turbine. If the current characteristics of the blade are different from the characteristics of the other blade, the failure detection system may change the operational mode of the turbine such as disconnecting the turbine from the utility grid or stopping the rotor.

18 Claims, 6 Drawing Sheets

DETECTING BLADE STRUCTURE ABNORMALITIES

BACKGROUND

Field of the Invention

Embodiments of the invention generally relate to wind turbine blade abnormalities and, more particularly, to determining when physical characteristics of a blade deviate from a predetermined characterization of the blade.

Description of the Related Art

Wind turbines are often situated in remote areas to take advantage of prevalent weather patterns in the area. In these remote areas, the wind turbines are often exposed to extreme environmental conditions. These extreme environmental conditions include, but are not limited to, extreme temperatures, rain, snow, ice, blowing debris, and rough seas. The environmental conditions, as well as aging, may cause structural failures in the turbine's blades—e.g., cracking, portions of the blade breaking off, or deforming.

To prevent catastrophic failure that would prevent the turbine from being able to operate (e.g., the blade detaching and damaging other portions of the wind turbine), a failure detection system may be used. If the detection system identifies a structural failure, the operation mode of the turbine may be changed to prevent the catastrophic failure. For example, the turbine may be removed from the utility grid until a cracked blade is fixed or replaced.

SUMMARY

Embodiments of the present disclosure include a method, system, and computer program product for detecting abnormalities in a first blade in a wind turbine. The method, system, and computer program product includes providing a predetermined characterization of the first blade where the characterization comprises at least one value of a physical characteristic of the first blade. The method, system, and computer program product includes deriving a current value of the physical characteristic of the first blade based on updated sensor data. Upon determining, based on a first error threshold, that the current value of the physical characteristic deviates from the value in the predetermined characterization, the method, system, and computer program product compares a first measured value associated with the first blade to a second measured value associated with a second blade. Upon determining, based on a second error threshold, that the first measured value differs from the second measured value, the method, system, and computer program product changes an operational mode of the wind turbine.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Detecting blade abnormalities or structural defects, such as cracking, deforming, chips, and the like, in a blade before the abnormalities result in a catastrophic failure which renders the blade irreparable or causes damage to other portions of the wind turbine may have financial as well as reputational advantages. Upon detecting abnormal behavior, a control system may change the operation mode of the turbine (e.g., decouple the turbine from the utility grid or stop the rotor). A technician may then be dispatched to the turbine to evaluate and repair the abnormality.

In one embodiment, a failure detection system generates a "fingerprint" for each blade on a turbine. The fingerprint may be a grouping of dynamic, physical characteristics of the blade such as its mass, strain ratio, damping ratio, and the like. The failure detection system may generate a fingerprint for each blade based on a manufacture's specification associated with the blade, the dynamic characteristics measured during a configuration stage, the dynamic characteristics measured when the blade is being validated in a testing facility, or any combination of these techniques. While the turbine is operating (e.g., generating power on a utility grid), the failure detection system receives updated sensor information that is used to derive the current characteristics of the blade. If the current characteristics deviate from the characteristics in the blade's fingerprint, the system identifies the blade as abnormal. In one embodiment, this initial characterization of abnormality can be verified with an additional comparison. For example, to confirm that the blade is indeed behaving abnormally (i.e., has a structural defect), the failure detection system may compare the characteristics of the blade that deviates from the fingerprint to characteristics of another blade on the turbine. Comparing the blades to each other mitigates the risk that a temporary environmental condition caused the current physical characteristics of the blade to deviate from its fingerprint. However, if the current characteristics of the blade are different from the characteristics of the other blade, the failure detection system confirms that the blade has an abnormality and changes the operational mode of the turbine such as disconnecting the turbine from the utility grid or stopping the rotor.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

An Example Wind Turbine Generator

Figure 1:
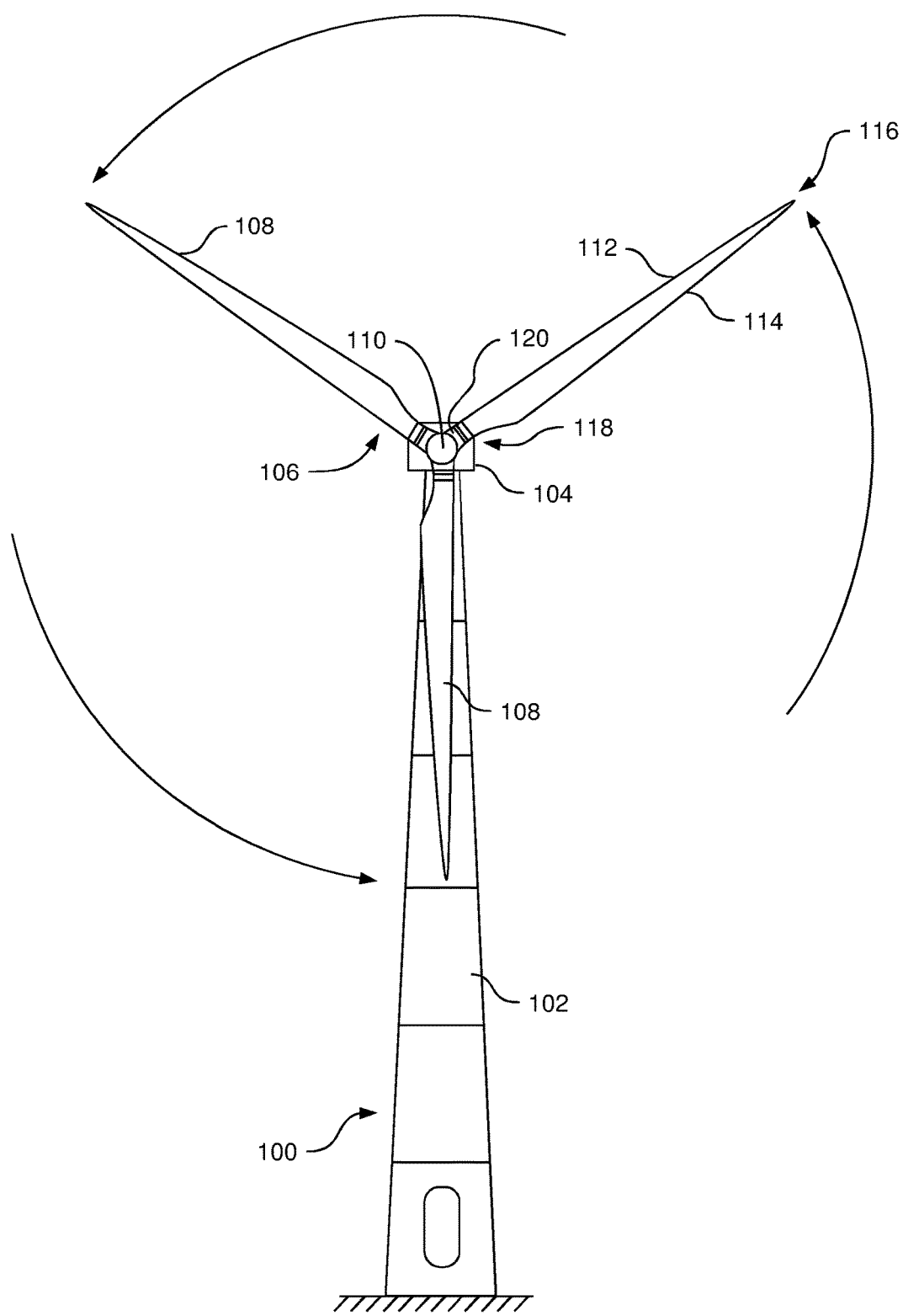
FIG. 1 illustrates a diagrammatic view of a wind turbine generator, according to one embodiment described herein.

FIG. 1 illustrates a diagrammatic view of a horizontal-axis wind turbine generator 100. The wind turbine generator 100 typically includes a tower 102 and a wind turbine nacelle 104 located at the top of the tower 102. A wind turbine rotor 106 may be connected with the nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108.

Figure 2:
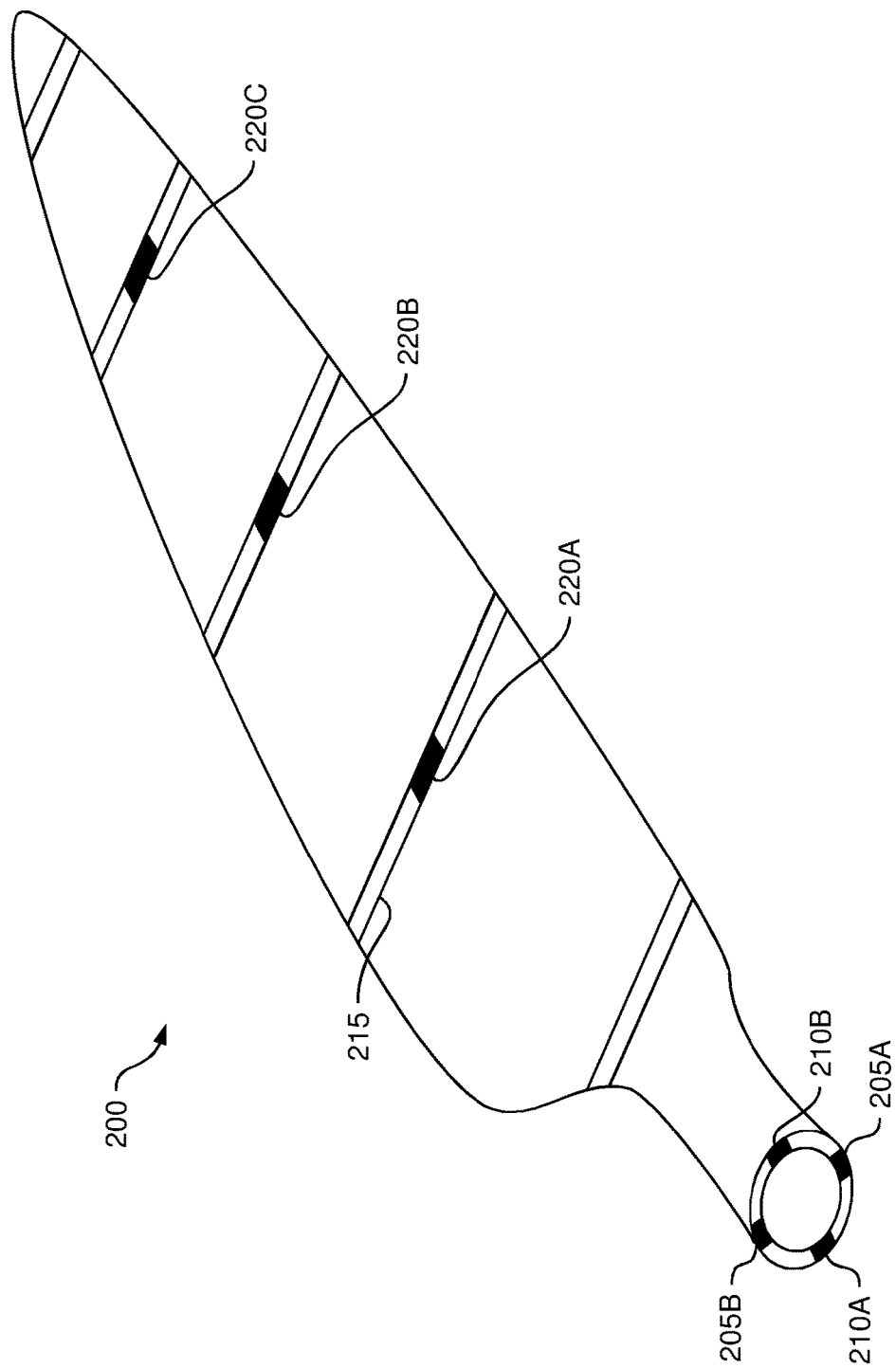
FIG. 2 illustrates various sensors associated with a turbine blade, according to one embodiment described herein.

FIG. 2 illustrates various sensors associated with a turbine blade 200, according to one embodiment described herein. The blade 200 includes edgewise load sensors 205A and 205B that measure the load generated by the blade 200 in the direction of rotation in the rotor plane and flapwise load sensors 210A and 210B that measure the load generated by the blade 200 in the direction perpendicular to the rotor plane. The edgewise and flapwise sensors 205 and 210 may capture load data at different azimuth angles (i.e., a degree of rotation in the rotor plane) to determine physical characteristics of the blade 200 such as its mass or damping ratio. In one embodiment, the sensors 205 and 210 are located at an interface between the blade 200 and the wind turbine rotor (not shown).

The blade 200 also includes a strain sensor system that includes the fiber optic cable 215 and the strain sensors 220A-220C. Using light carried by the fiber optic cable 215, the strain sensors 220A-220C measure an amount of strain or deflection—i.e., how much the structure of the blade 200 bends or deforms—on the blade 200. Similar to the forces measured by the load sensors 205 and 210, the strain sensors 220A-220C may measure the strain on the blade at different azimuth angles to determine a physical characteristic of the blade 200—e.g., the blade's strain ratio. In another embodiment, other sensors that measure different forces may be placed on the blade 200 or in the wind turbine to identify physical characteristics of the blade. Moreover, the blade 200 may include additional (or fewer) load or strain sensors 205, 210, and 220 than the ones depicted in FIG. 2.

Detecting Blade Abnormalities

Figure 3:
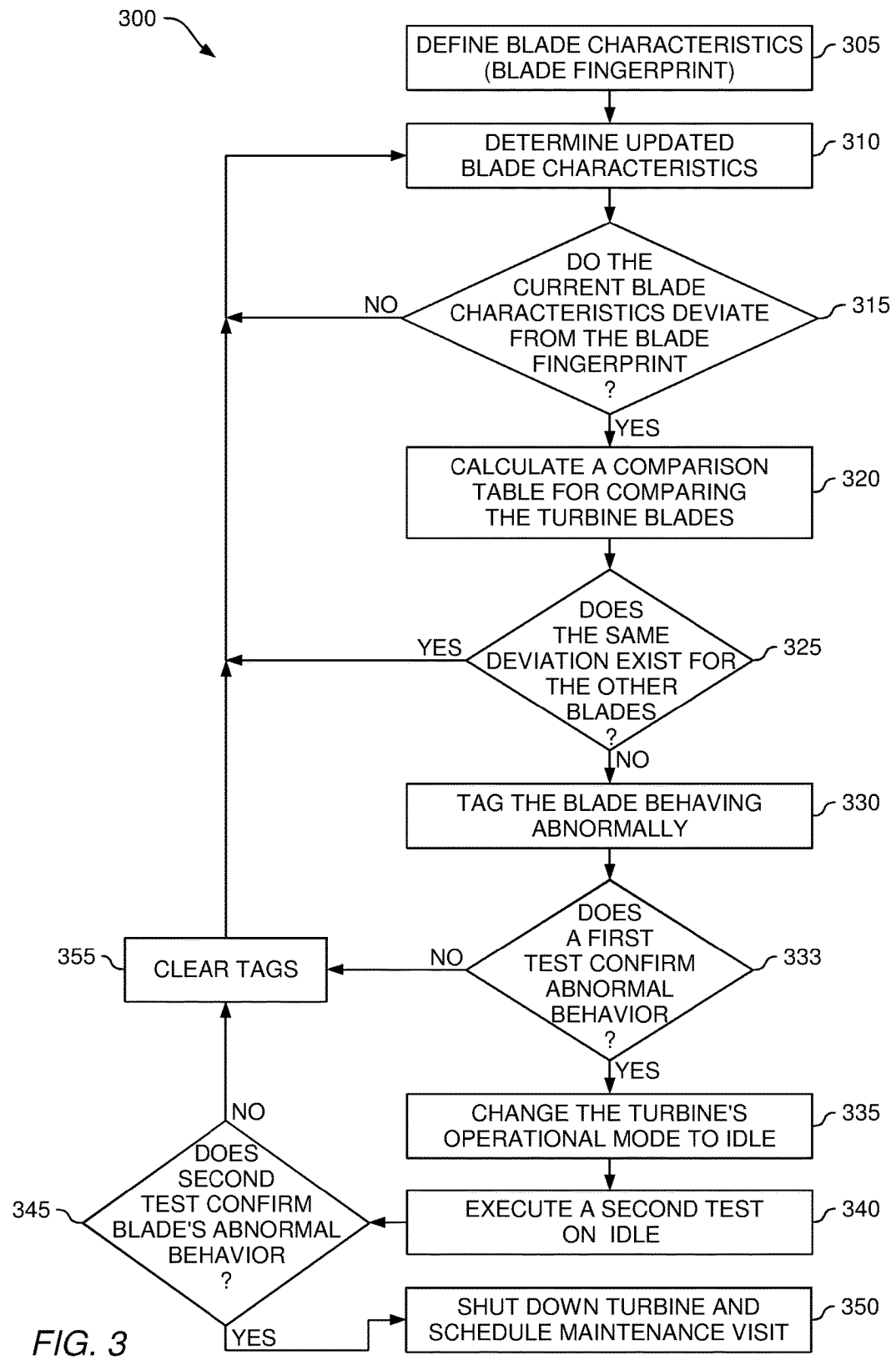
FIG. 3 illustrates a method of detecting blade abnormalities, according to one embodiment described herein.

FIG. 3 illustrates a method 300 of detecting blade abnormalities, according to one embodiment described herein. At block 305, a failure detection system may define blade fingerprints for each blade in a wind turbine. The fingerprints may include a grouping of different physical characteristics of the turbine such as the blade's mass, strain ratio, damping ratio, and other second order physical characteristics. In one embodiment, the physical characteristics are dynamic and may change during turbine operation. For example, if a piece of the blade is knocked off, the blade's mass changes, or if high winds deform a blade, its strain ratio may change. In one embodiment, the characteristics that make up the blade's fingerprint may be derived from manufacturer's specification. For example, the manufacturer may indicate that a turbine is guaranteed to be a certain weight plus or minus ten kilograms. In other embodiments, the characteristics may be determined by performing tests on the blades either in a testing facility or as part of a configuration stage of installing a turbine. For example, the first hundred rotations of a turbine (when the turbine is not connected to the utility grid) may be used to gather data from the sensors shown in FIG. 2 to develop the fingerprints for the blades. In one embodiment, the failure detection system may use a combination of the manufacturer's specification and the measured data to generate the fingerprints.

At block 310, the failure detection system may receive updated sensor data for one of the blades on the turbine. The sensor data may include, for example, the current strain of the blade or the edgewise and flapwise moments (N/m) of the blade. In one embodiment, the failure detection system may use the sensor data to derive updated physical characteristics associated with the blade.

For example, the edgewise or flapwise moments may be measured when the blade is in front of the turbine tower (an azimuth angle of 180 degrees) and at the top of the rotor plane (an azimuth angle of 0 degrees). By correlating the data measured at the two different azimuth angles, the failure detection system may identify the current mass of the blade. In one embodiment, the physical characteristics may be derived using, for example, five to ten rotations of the rotor. That is, the sensor data may be averaged across multiple rotations. Doing so may mitigate errors that can occur when the sensor data is measured during spikes in environmental conditions such as a sudden wind gust. Thus, in one embodiment, mining the data from the sensors in the blade may take several minutes before the failure detection system uses the sensor data to derive the physical characteristics of the blade.

At block 315, the failure detection system compares the current physical characteristics derived from the updated sensor data to the blade's fingerprint. The failure detection system may be configured with one or more predefined thresholds that represent when the current physical characteristics deviate from the characteristics included within the blade's fingerprint. For example, if the current damping ratio varies more than 15% from the damping ratio in the fingerprint, the failure detection system may indicate the blade is behaving abnormally. In some embodiments, the failure detection system may have different predefined thresholds for each of the physical characteristics in the fingerprint.

The failure detection system may compare each current physical characteristic blade to each physical characteristic in the fingerprint. In one embodiment, so long as one of the physical characteristics exceeds the associated threshold, the failure detection system determines that the blade is behaving abnormally and proceeds to block 320.

Alternatively, the failure detection system may require that a plurality of the blade's current characteristics (e.g., two out of three) deviate from the values stored in the fingerprint before classifying the blade's behavior as abnormal. If the failure detection system determines, however, that the current blade characteristics do not deviate from the fingerprint, the method 300 returns to block 310 to receive updated sensor data.

At block 320, the failure detection system uses the data gathered from the individual turbines to generate comparison tables for confirming that a blade is indeed behaving abnormally. To generate the comparison tables, the failure detection system may convert the sensor data from being based on time (e.g., the edgewise moment measured on a blade at a specific time) to being based on azimuth angle (e.g., the edgewise moment measured when the blade is at specific location in the rotor plane). The failure detection system may generate a comparison table using this converted sensor data where the comparison table includes values that represent the different forces, moments or physical characteristics measured on the blades of the turbine. For example, the comparison table may include an edgewise moment difference value that represents the difference between the edgewise moment measured on Blade A and the same moment measured on Blade B at a specific azimuth angles. The comparison table may also include other difference values corresponding to other azimuth angles as well as a history of past difference values. The failure detection system may be configured to either generate the comparison table based on comparing only a subset of the turbines to each other (e.g., Blade A versus Blade B) or generate the comparison table based on comparing each blade to every other blade in the turbine (e.g., Blade A versus Blade B, Blade B versus Blade C, and Blade C versus Blade A in a three-blade turbine).

Although block 320 is shown as occurring after determining that the current blade characteristics deviate from the black fingerprint, block 320 may occur in parallel with method 300. That is, the turbine may continually (or at a predetermined interval) update the comparison table based on receiving updated force data—e.g., the edgewise and flapwise moments. Thus, in one embodiment, the comparison table may be already populated once the failure detection system determines that the current blade characteristic deviates from the blade fingerprint.

At block 325, the failure detection system compares a force, moment, or a physical characteristic of the blade identified as abnormal in block 315 to the force, moment, or physical characteristic of at least one other blade in the turbine using the comparison table. For example, if the damping ratio of Blade A decreased by 20% compared to the damping ratio in Blade A's fingerprint, the current damping ratio of Blade B may also be compared to its blade's fingerprint to determine if its relative damping ratio also had a similar drop. That is, the failure detection system may store in the comparison table a difference value that represents the divergence between the change in the damping of Blade A and Blade B. Alternatively, the damping ratio for both Blade A and Blade B may be compared directly. For example, if difference value derived from comparing the current damping ratio (or the change in the damping ratio) of Blade A to the same characteristic of Blade B indicates that the respective physical characteristic values are within 10% of each other, the failure detection system determines that the Blade A is not behaving abnormally. Instead, the deviation from the blade's fingerprint detected at block 315 may have been caused by an environmental condition such as a sudden increase in wind speeds or an icing condition that adds stress to the blades.

The failure detection system may also compare the physical characteristic to other blades besides Blade B (e.g., compare Blade A to Blade C) in the wind turbine to determine whether Blade A is behaving abnormally. Moreover, the failure detection system may be configured to confirm that Blade A is behaving abnormally if either the moments measured on Blade A differ from the moments measured on one of Blade B or Blade C. Or the failure detection system may confirm that Blade A is behaving abnormally only if the moments measured on Blade A differ from the moments measured on both Blade B and Blade C. In another embodiment, instead of comparing the forces of the blade identified at block 315 with another blade on the same turbine, the failure detection system may compare the blade to a blade located on a different turbine that may be in the same wind farm or park.

If both block 315 and 325 indicate that a particular turbine is behaving abnormally, at block 330, the failure detection system tags the blade behaving abnormally. Tagging the blade may indicate to a separate system in the turbine or SCADA to perform additional tests on the abnormal blade. For example, tagging the blade may result in activating a separate testing module that confirms that the blade has a structural abnormality at block 333. In one embodiment, the testing module performs a first test while the blade is still connected to the grid. For example, the turbine may be derated by the test executing a series of predefined or sequential changes in pitch angle for the tagged blade and measuring the physical characteristics of the blade. If the test confirms that the blade was properly tagged—i.e., the blade is behaving abnormally—the testing module may perform additional tests after changing the turbine's operational mode.

At block 335, the failure detection system changes the turbine's operational mode to idle. In one embodiment, changing the operational mode to idle disconnects the turbine from the electrical grid. However, in another embodiment, the operational mode may be changed such that the turbine is derated—e.g., outputs 2 MW of power instead of 3 MW. Here, the turbine may remain connected to the electrical system but the load is decreased thereby enabling a testing module to better evaluate the load on the blades.

At block 340, the testing module located on the turbine or the SCADA may execute a second test on the blade after its operational mode has been changed to confirm the structural defect detected at blocks 315 and 325. In one embodiment, the second self-test is executed while the turbine is on idle—i.e., disconnected from the utility grid.

While disconnected, a sinusoidal pitch reference may be applied to the tagged blade. Further still, a white noise signal may be applied to the pitch reference signal in specified predefined frequency ranges that are likely associated with the structural defect. Or the rotor may be excited by adding torque from the generator (e.g., a sinusoidal or white noise excitation) to make the structural damage more apparent to the testing module. Further still, in one embodiment, the self-test may be performed on only the tagged blade or blades.

At block 345, if the testing module confirms that the blade has a structural defect, the failure detection module may shut down the turbine and schedule a maintenance visit at block 350. For example, the turbine with the tagged blade may be offshore where sending a maintenance crew is costly. Thus, the additional self-test may be used to confirm that the tagged blade indeed has a structural defect. Thus, for wind parks where scheduling maintenance tasks are less expensive, blocks 340 and 345 may be omitted. If the self-test does not indicate that the tagged blade has a structural defect, at block 355 the tag may be cleared and method 300 returns to block 310 to repeat the failure detection technique.

In one embodiment, method 300 may perform additional tests at other blocks in the flow chart. For example, during operation (i.e., without changing the operational mode of the turbine), after block 315, the failure detection system may perform a structural test on the blade whose current characteristics deviate from its blade fingerprint.

Figure 4:
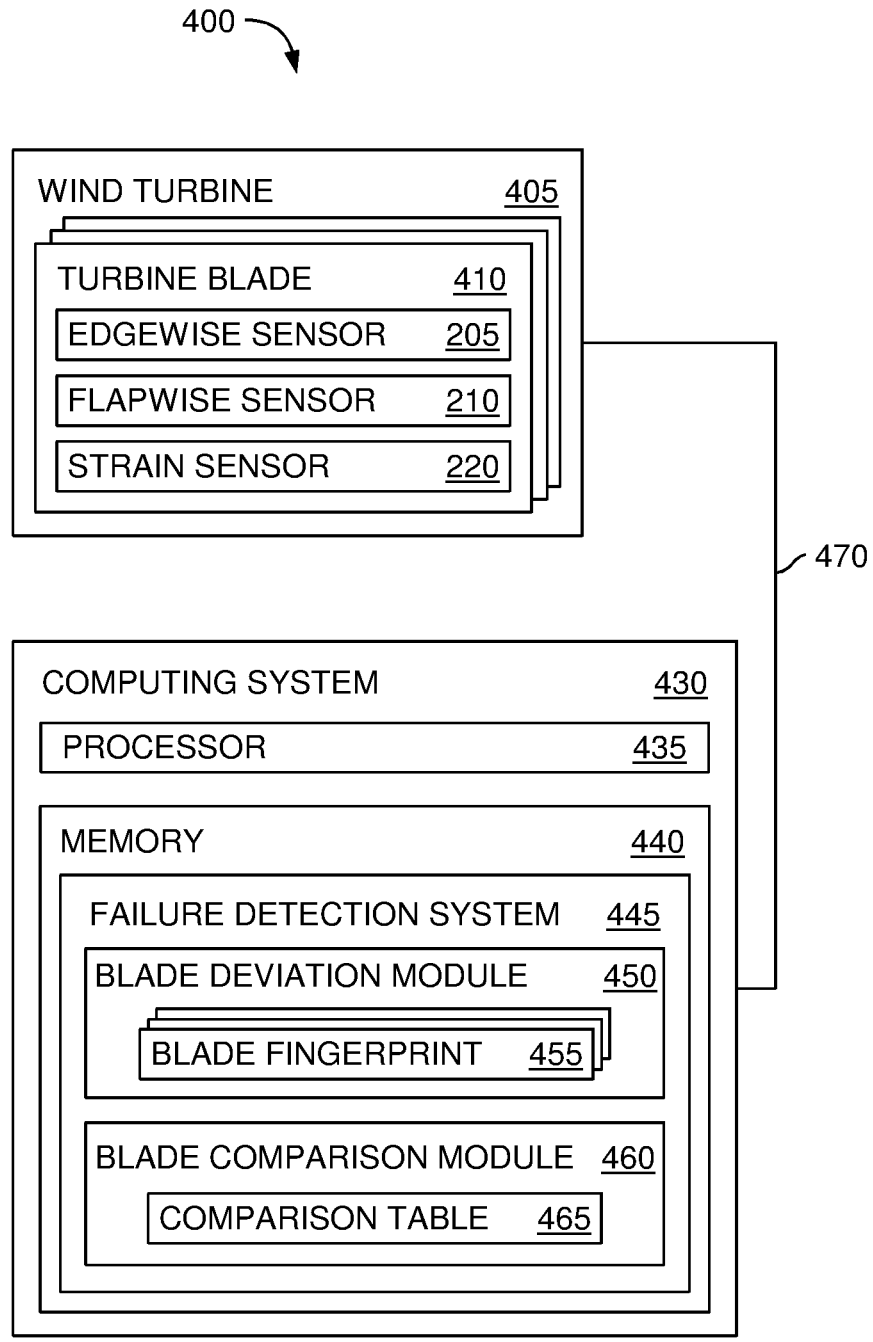
FIG. 4 illustrates a system for detecting blade abnormalities, according to one embodiment described herein.

FIG. 4 illustrates a system 400 for detecting blade abnormalities, according to one embodiment described herein. The system 400 includes at least one wind turbine 405 and a computing system 430. The wind turbine 405 may be any type of wind power plant with any number of turbine blades 410. As shown, each blade 410 includes one or more edgewise load sensors 205, flapwise load sensors 210, and strain sensor 220 which may be located in the positions shown in FIG. 2. In other embodiments, the blade 410 may include additional types of force sensors or only a subset of the sensors shown. Moreover, the system 400 may include a plurality of wind turbines arranged in a wind farm or plant that each are communicatively coupled to the computing system 430 via respective communication links 470. The link 470 represents any wired or wireless communication channel the permits the computing system 430 to receive sensor data from the turbine 405 as well as transmit commands to the turbine 405 such as a command to change the operational mode of the turbine 405.

The computer system 430 includes a processor 435 and memory 440 and may, in one embodiment, be part of a control and monitoring system (SCADA) associated with the turbine 405. The processor 435 represents any type of processing element capable of performing the functions detailed herein. For example, the processor 435 may represent multiple processors or multi-core processors. The memory 440 may be implemented by volatile or non-volatile memory such as random access memory (e.g., DRAM or Flash) or cache. Memory 440 may also include storage elements such as a hard disk drive, solid state device (SSD), flash memory storage drive, or even memory elements external to the computing system 430.

The memory 440 includes a failure detection system 445 which may be an application that is executed by the computing system 430. In one embodiment, however, the failure detection system 445 may include hardware components or be a combination of hardware and software. The failure detection system 445 includes two modules: the blade deviation module 450 and the blade comparison module 460. The blade deviation module 450 may perform the function described in block 315 where the current characteristics of a blade are compared to the blade's fingerprint 455. Accordingly, the blade deviation module 450 may include multiple fingerprints 455 that each correspond to respective blades 410 in wind turbine 405. In one embodiment, the blade deviation module 450 uses the sensor data from the wind turbine 405 to calculate the current physical characteristics of one of the blades (e.g., the blade's mass, damping ratio, stress ratio, and the like) and compares the calculated values to the ones stored in the fingerprint 455. If the difference between the values exceeds one or more predefined error thresholds, the failure detection system 445 may execute the blade comparison module 460 to confirm that the blade 410 is behaving abnormally. In one embodiment, the blade deviation module 450 may also be configured to generate the fingerprint 455 based on a manufacture's specification or a configuration stage as discussed previously. Alternatively, a separate application or computing system not shown in system 400 may be tasked with generating fingerprint 455 which is then transmitted to the failure detection system 445.

In one embodiment, the blade deviation module 450 may constantly gather sensor data from the wind turbine 405 and determine whether each blade 410 has deviated from its respective fingerprint 455. Alternatively, the blade deviation module 450 may only be executed at certain intervals or the module 450 may test each blade 410 sequentially—e.g., in a round-robin manner. Further still, the deviation module 450 may gather data measured at the same azimuth angle for a plurality of rotations. For example, the module 450 may record the edgewise moment on Blade A each time the blade 410 reaches 180 degrees on the rotational plane. The deviation module 450 may derive one or more of the physical characteristics based an average of the plurality of measured edgewise moment values. Using multiple rotations represents the tradeoff between avoiding false positives (e.g., if the physical characteristic is derived during a sudden wind gust) and the time required to mine the data from the turbine. Accordingly, the amount of data mined before deriving the physical characteristics may be adjusted as desired.

The blade comparison module 460 may be called once the blade deviation module 450 determines that a blade deviates from its fingerprint 455. Stated differently, the blade comparison module 460 may be used to confirm that the blade is behaving abnormally. As shown, the blade comparison module 460 calculates one or more comparison tables 465. In one embodiment, the sensor data transmitted by the wind turbine 405 may also be received by the blade comparison module 460. Based on these sensor values, the blade comparison module 460 generates the comparison table 465 which contains values that reflect a difference between forces, moments or physical characteristics associated with the respective blades 410. Because the sensor data may be measured based on time, the sensor data from different turbines may not correlate. That is, the edgewise moment for Blade A measured at a specific time may not be comparable to the edgewise for Blade B at that same time since Blade A may be at 180 degrees in the rotor plane while Blade B may be at 60 degrees or 300 degrees (assuming a standard three-blade turbine). Thus, the blade comparison module 460 may convert the received sensor data from varying based on time to varying based on the azimuth angle. Although the embodiments provided herein describe converting the sensor data from the time domain to a domain dependent on azimuth angle, the sensor data may be converted into other quantities such as pitch angle, wind speed, rotational speed, produced power, tower acceleration, or combinations thereof. This conversion process which will be discussed in further detail below.

The blade comparison module 460 compares the converted sensor data of the plurality of blades to generate one or more difference values that are stored in the comparison table 465. For example, the comparison table 465 may include a list of values that identify a difference between the flapwise moment exerted on Blade A and the flapwise moment exerted on Blade B at a particular azimuth angle over a certain number of rotor cycles—e.g., the last 100 rotations. Moreover, the table 465 may include a separate listing for separate azimuth angles—e.g., difference values when the turbines were at 0 degrees and when the turbines were at 180 degrees on the rotor plane. Using the comparison table 465, confirmation logic in the blade comparison module 460 determines whether the difference value exceeds an error threshold. For example, the confirmation logic may evaluate an average of the plurality of difference values (measured in the last 100 rotations) to determine whether the average value exceeds the error threshold. If so, the blade comparison module 460 may confirm that the blade 410 is indeed behaving abnormally. In response, failure detection system 445 may send a control signal to the wind turbine 405 to change the operational mode of the turbine 405.

In one embodiment, the blade comparison module 460 may update the comparison table 465 at the same time the blade deviation module 450 determines whether the blade 410 deviates from its fingerprint 455. That is, each time the wind turbine 405 transmits updated sensor data to the computing system 430, the blade comparison module 460 updates the comparison table 465 without waiting to see whether the blade deviation module 450 has identified a possible abnormal blade. Thus, updating the comparison table 465 may be a pre-calculation process that is performed in parallel with (or concurrently to) the blade deviation module 450. In this manner, once the blade deviation module 450 does identify a possible abnormal blade, the blade comparison module 460 may instantiate the comparison logic to determine if the abnormal blade differs from the other blades on the turbine without having to generate or update the comparison tables 465.

Figure 5A:
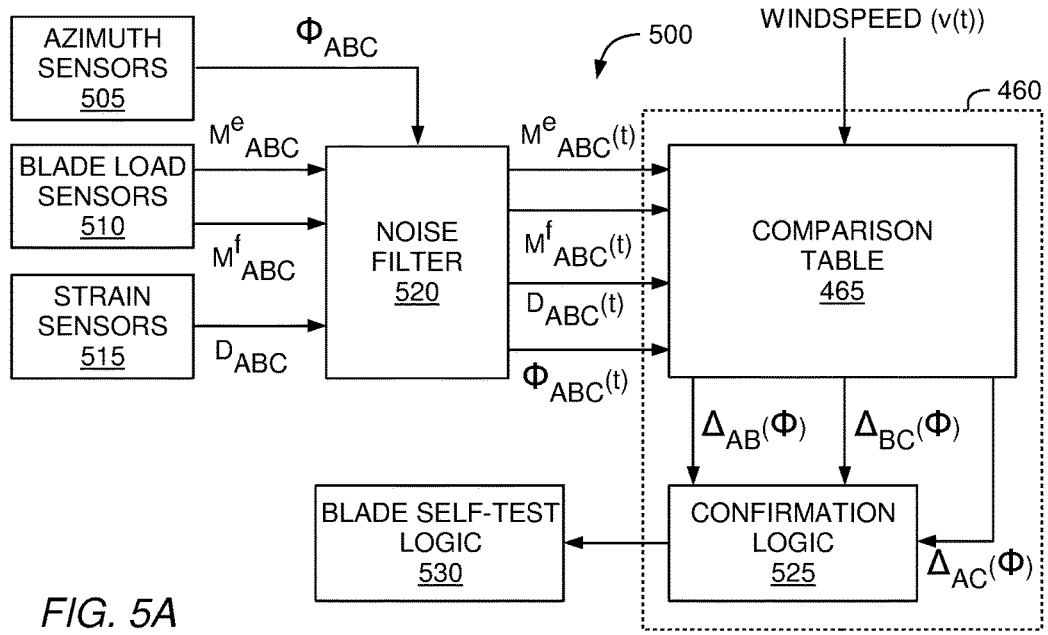
FIGS. 5A-5B illustrate generating a comparison table for comparing turbine blades, according to embodiments described herein.
Figure 5B:
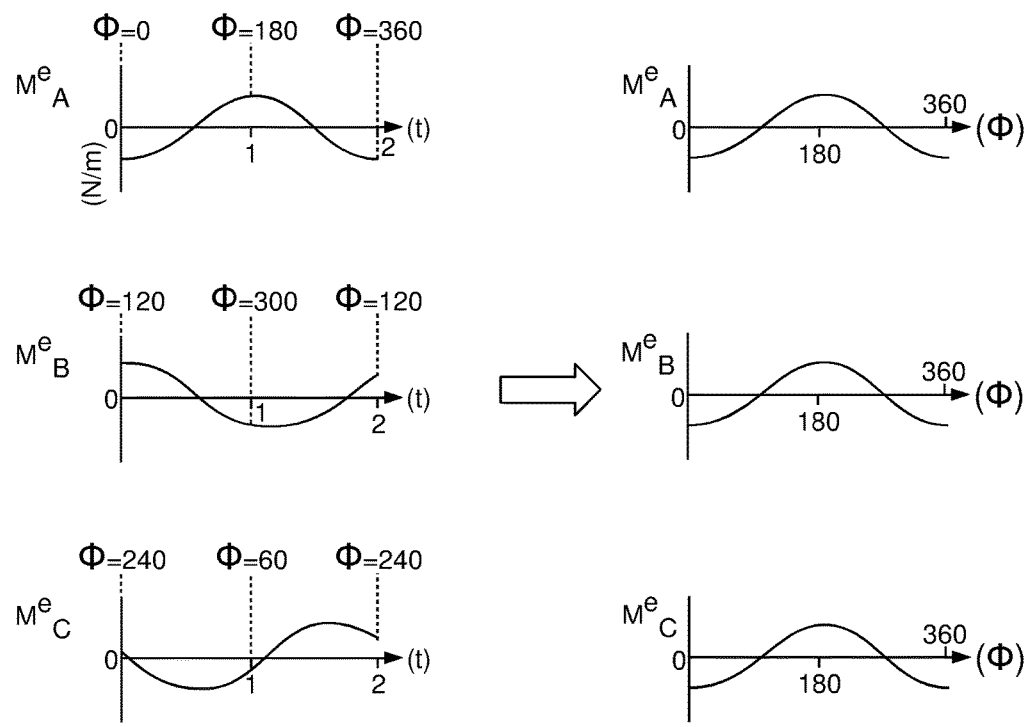

FIGS. 5A-5B illustrate generating a comparison table 465 for comparing turbine blades, according to embodiments described herein. Specifically, FIG. 5A illustrates a system 500 that includes an azimuth sensor 505, one or more blade load sensors 510, and strain sensors 515. The azimuth sensor 505 may be located on a wind turbine and provides the current azimuth angle ($\phi$) of Blades A, B, and C in the turbine (i.e., $\phi_{ABC}$). For example, the azimuth sensor 505 may transmit the current angle for Blades A, B, and C to the failure detection system at one second intervals. At the same interval, the blade load sensors 510 (e.g., the edgewise and flapwise sensors shown in FIG. 2) may transmit updated edgewise ($M^e$) and flapwise ($M^f$) moment values associated with Blades A, B, and C to the failure detection system. Further still, the strain sensors may transmit a current stress or deflection (D) on each blade at the same interval.

After passing through the noise filter 520, the blade comparison module 460 may convert the time based moment and strain values into azimuth based moment and strain values. FIG. 5B is an example of this conversion. The left side of FIG. 5B illustrates the different edgewise moments associated with the three turbine blades—$M^e_A$, $M^e_B$, and $M^e_C$—based on a time the moments are measured. Because the three blades are at different azimuth angles at different time (here, the offset is 120 degrees) the edgewise moments at any particular time vary drastically. However, the blade comparison module can use the azimuth sensor to, in a sense, shift the sensor data to remove the time dependency. Using both a buffer to store the sensor data and the signal from the azimuth sensor 505, the blade comparison module 460 converts the time based signals to azimuth based signals as shown in the right side of FIG. 5B. In general, comparing the blades based on a particular location in the rotor plane (i.e., azimuth angle) yields more accurate results than comparing the blades based on a particular time. Doing so, however, may introduce new inaccuracies into the comparison, for example, if there is a sudden and brief wind gust that affects one turbine at a particular azimuth angle, but if the wind gust abates by the time the other wind turbines reach the same azimuth angle, the blade comparison may be inaccurate. These types of errors can be mitigated, however, by averaging moment values from multiple rotations at the same azimuth angle. Moreover, the blade comparison module 460 may use a current wind speed to improve the accuracy of the conversion. For example, if the wind speed differs substantially between measurements, the data may be ignored—i.e., not converted from one domain to another.

The blade comparison module 460 may use the converted sensor data and the current wind speed to generate the comparison table 465. As mentioned previously, the difference values stored in the comparison table 465 may represent the difference between the moments or physical characteristics of the respective turbines at a particular azimuth angle. For example, the $\Delta_{AB}(\phi)$ is the difference between the edgewise and flapwise moments, as well as the deflection, of Blade A and Blade B:

$$|M_A^e - M_B^e| \& |M_A^f| \text{ and } |D_A - D_B| \text{ at } \phi = c \qquad (1)$$

The module 460 may perform similar logic to generate the difference values between all the blades in the turbine—i.e., $\Delta_{BC}(\phi)$ and $\Delta_{AC}(\phi)$. Further, instead of comparing moments as shown in FIGS. 5A-B, the module 460 may first derive the physical characteristics (e.g., mass) and generate difference values based on the physical characteristics. The confirmation logic 525 may query the comparison table 465 to retrieve a difference value which the logic 525 then compares to a respective error threshold for determining if the moment associated with one blade is substantially different than the moment associated with another blade.

If the confirmation logic 525 determines that a moment or characteristics of one blade substantially deviates from the moment or characteristic of another blade, the logic 525 may tag the blade which indicates that blade self-test logic 530 should perform additionally testing on the tagged blade either before the operational mode of the turbine is changed (i.e., the self test shown at block 333 of FIG. 3) or after the mode is changed to idle (i.e., the self test shown at block 340 of FIG. 3). The blade self-test logic 530 may be hardware, software, or a combination of both that is, e.g., located on the turbine or part of a SCADA system associated with the turbine.

Figure 6:
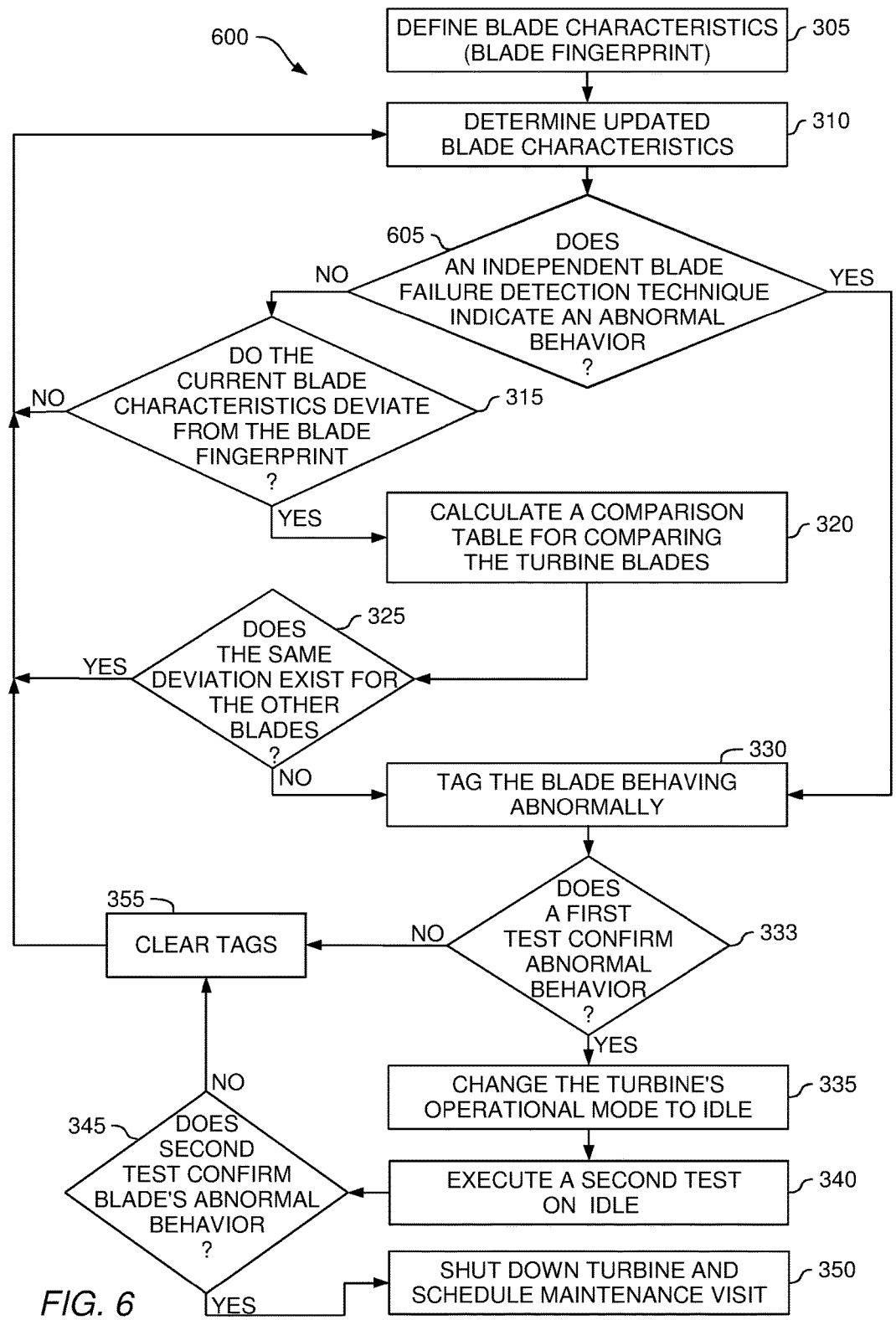
FIG. 6 illustrates a method of detecting blade abnormalities using a combination of failure detection techniques, according to one embodiment described herein.

FIG. 6 illustrates a method 600 of detecting blade abnormalities using a combination of failure detection techniques, according to one embodiment described herein. FIG. 6 differs from method 300 shown in FIG. 3 in that method 600 includes block 605. Specifically, at block 605, an independent failure detection system may be used to indicate whether a blade is behaving abnormally. Because performing the tests represented in blocks 315 and 325 may take substantial amounts of time (e.g., the time necessary for the blades to rotate 5-10 cycles), the failure detection system includes a secondary, independent detection technique which may return results quicker than the other techniques in method 600. For example, the secondary detection technique performs an optical continuity check or generates an estimate of the blade's weight or mass. For example, the blade may include an optical continuity check system where at least one optical fiber is wrapped around the blade. So long as the light transmitted at one end of the fiber reaches the other end of the fiber, the blade passes the test. However, if a portion of the blade becomes detached, thereby severing the optical fiber, the light will not reach the end of the fiber indicating the blade has a structural failure.

In another embodiment, the secondary failure technique may use the same data sensors used in blocks 315 and 325 to identify abnormal behavior. For example, load sensors may be used to measure the moment of the blade at 0 degrees and 180 degrees in the rotor plane. For these values, the failure detection system may derive an estimate of the blades mass based on a single rotation of the blade. Although estimated mass may be inaccurate if, for example, the load measurements are taken during an extreme wind gust, error threshold that is compared to the estimated mass may be large enough that the effects of environmental conditions are irrelevant. For example, the error threshold may require a 10% loss of mass before the blade is labeled as abnormal but the environmental conditions may at most cause the estimate to be off by 5%. Thus, block 605 will indicate that the blade is behaving abnormally only if some portion of the blade has detached. In this manner, the secondary failure technique added to method 600 may be less accurate than the other techniques but can identify major failures in a quicker amount of time.

If the secondary failure technique identifies a blade that is behaving abnormally, the method 600 proceeds directly to block 335 where the turbine's operation mode is changed—e.g., idling or derating the turbine. In one embodiment, the failure detection system may respond differently depending on whether the secondary technique of block 605 rather than the primary technique of blocks 315 and 325 determines a blade is behaving abnormally. If the primary technique determines a blade is behaving abnormally, the failure detection system may disconnect the blade from the power grid but allow the rotor to continue to rotate. If the secondary technique identifies the abnormal behavior, the failure detection system may stop the rotor immediately. The rest of method 600 may the same as that described previously in FIG. 3.

In the previous discussion, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

CONCLUSION

Detecting blade abnormalities or structural defects, such as cracking, deforming, chips, and the like, in a blade before the abnormalities result in a catastrophic failure which renders the blade irreparable or causes damage to other portions of the wind turbine may have financial as well as reputational advantages. Upon detecting abnormal behavior, a control system may change the operation mode of the turbine (e.g., decouple the turbine from the utility grid or stop the rotor). A technician may then be dispatched to turbine to evaluate and repair the abnormality.

In one embodiment, a failure detection system generates a fingerprint for each blade on a turbine. The fingerprint may be a grouping a dynamic, physical characteristics of the blade such as its mass, strain ratio, damping ratio, and the like. The failure detection system may generate a fingerprint for each blade based on a manufacture's specification associated with the blade, the dynamic characteristics measured during a configuration stage, the dynamic characteristics measured when the blade is being validated in a testing facility, or any combination of these techniques. While the turbine is operating (e.g., generating power on a utility grid), the failure detection system receives updated sensor information that is used to derive the current characteristics of the blade. If the current characteristics deviate from the characteristics in the blade's fingerprint, the system identifies the blade as abnormal. To confirm that the blade is indeed behaving abnormally (i.e., has a structural defect), the failure detection system may compare the characteristics of the blade that deviates from the fingerprint to characteristics of another blade on the turbine. Comparing the blades to each other mitigates the risk that a temporary environmental condition caused the current physical characteristics of the blade to deviate from its fingerprint. However, if the current characteristics of the blade are different from the characteristics of the other blade, the failure detection system confirms that the blade has an abnormality and changes the operational mode of the turbine such as disconnecting the turbine from the utility grid or stopping the rotor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of detecting abnormalities in a first blade in a wind turbine, comprising:
   providing, in a computer memory, a predetermined characterization of the first blade, the characterization comprising at least one value of a physical characteristic of the first blade;
   deriving, by a computer processor, a current value of the physical characteristic of the first blade based on updated sensor data;
   comparing the current value of the physical characteristic to the predetermined characterization;
   upon determining, based on a first error threshold, that the current value of the physical characteristic deviates from the value in the predetermined characterization, thereby indicating an operating abnormality of the first blade potentially exists, comparing a first measured value associated with the first blade to a second measured value associated with a second blade; and
   in response to comparing the first measured value to the second measured value and upon determining, based on a second error threshold, that the first measured value differs from the second measured value, thereby confirming existence of the operating abnormality of the first blade, changing an operational mode of the wind turbine due to the existence of the operating abnormality of the first blade, wherein changing an operational mode of the wind turbine comprises at least one of: disconnecting the wind turbine from a utility grid, stopping a rotor of the wind turbine from rotating, and derating the wind turbine.

2. The method of claim 1, wherein the first and second blades are located on the same wind turbine, further comprising:
   comparing the first measured value of the first blade to a third measured value associated with a third blade in the wind turbine, wherein changing the operational mode of the wind turbine is performed only if the first measured value differs from both the second and third measured values based on respective error thresholds.

3. The method of claim 1, wherein sensor data used to generate the first and second measured values is converted from being dependent on time to being dependent on a physical characteristic of the wind turbine, wherein comparing the first measured value to the second measured value comprises:
   evaluating a difference value stored in a comparison table, wherein the difference value is generated by comparing the first measured value to the second measured value at a particular value of the physical characteristic.

4. The method of claim 1, wherein the first measured value and second measured value are based on at least one of a force measured on the wind turbine and a physical characteristic of the first and second blades derived from updated sensor data.

5. The method of claim 1, wherein the predetermined characterization is generated based on at least one of a manufacturer's specification associated with the first blade and sensor data mined during a configuration stage of the wind turbine.

6. The method of claim 1, further comprising:
before changing the operational mode of the turbine, performing a first self test on the first blade;
after changing the operational mode of the turbine, performing a second self test on the first blade, wherein changing an operational mode of the wind turbine comprises at least one of: disconnecting the wind turbine from a utility grid and stopping a rotor of the wind turbine from rotating; and
upon determining the first and second self tests confirm the first blade is behaving abnormally, informing a maintenance system that the first blade is behaving abnormally.

7. The method of claim 1, further comprising, determining, based on a secondary detection technique, whether the updated sensor data satisfies a third error threshold, wherein the secondary detection technique requires less time to execute than determining whether the current value of the physical characteristic deviates from the value in the predetermined characterization.

8. A system, comprising:
a computer processor; and
a memory containing a program that, when executed on the computer processor, performs an operation for detecting abnormalities in a first blade in a wind turbine, comprising:
providing a predetermined characterization of the first blade, the characterization comprising at least one value of a physical characteristic of the first blade;
deriving a current value of the physical characteristic of the first blade based on updated sensor data;
comparing the current value of the physical characteristic to the predetermined characterization;
upon determining, based on a first error threshold, that the current value of the physical characteristic deviates from the value in the predetermined characterization, thereby indicating an operating abnormality of the first blade potentially exists, comparing a first measured value associated with the first blade to a second measured value associated with a second blade; and
in response to comparing the first measured value to the second measured value and upon determining, based on a second error threshold, that the first measured value differs from the second measured value, thereby confirming existence of the operating abnormality of the first blade, changing an operational mode of the wind turbine due to the existence of the operating abnormality of the first blade, wherein changing an operational mode of the wind turbine comprises at least one of: disconnecting the wind turbine from a utility grid, stopping a rotor of the wind turbine from rotating, and derating the wind turbine.

9. The system of claim 8, wherein the first and second blades are located on the same wind turbine, the operation further comprising:
comparing the first measured value of the first blade to a third measured value associated with a third blade in the wind turbine, wherein changing the operational mode of the wind turbine is performed only if the first measured value differs from both the second and third measured values based on respective error thresholds.

10. The system of claim 8, wherein sensor data used to generate the first and second measured values is converted from being dependent on time to being dependent on a physical characteristic of the wind turbine, wherein comparing the first measured value to the second measured value comprises:
evaluating a difference value stored in a comparison table, wherein the difference value is generated by comparing the first measured value to the second measured value at a particular value of the physical characteristic.

11. The system of claim 8, wherein the first measured value and second measured value are based on at least one of a force measured on the wind turbine or a physical characteristic of the first and second blades derived from updated sensor data.

12. The system of claim 8, wherein the predetermined characterization is generated based on at least one of a manufacture's specification associated with the first blade and sensor data mined during a configuration stage of the wind turbine.

13. The system of claim 8, the operation further comprising, determining, based on a secondary detection technique, whether the updated sensor data satisfies a third error threshold, wherein the secondary detection technique requires less time to execute than determining whether the current value of the physical characteristic deviates from the value in the predetermined characterization.

14. A computer program product for detecting abnormalities in a first blade in a wind turbine, the computer program product comprising:
a non-transitory computer-readable storage medium having computer-readable program code embodied therewith, the computer-readable program code comprising computer-readable program code configured to:
provide a predetermined characterization of the first blade, the characterization comprising at least one value of a physical characteristic of the first blade;
derive a current value of the physical characteristic of the first blade based on updated sensor data;
comparing the current value of the physical characteristic to the predetermined characterization;
upon determining, based on a first error threshold, that the current value of the physical characteristic deviates from the value in the predetermined characterization, thereby indicating an abnormality of the first blade potentially exists, comparing a first measured value associated with the first blade to a second measured value associated with a second blade; and
in response to comparing the first measured value to the second measured value and upon determining, based on a second error threshold, that the first measured value differs from the second measured value, thereby confirming existence of the abnormality of the first blade, changing an operational mode of the wind turbine due to the existence of the abnormality of the first blade, wherein changing an operational mode of the wind turbine comprises at least one of: disconnecting the wind turbine from a utility grid, stopping a rotor of the wind turbine from rotating, and derating the wind turbine.

15. The computer program product of claim 14, wherein the first and second blades are located on the same wind turbine, further comprising computer-readable program code configured to:
compare the first measured value of the first blade to a third measured value associated with a third blade in the wind turbine, wherein changing the operational mode of the wind turbine is performed only if the first measured value differs from both the second and third measured values based on respective error thresholds.

16. The computer program product of claim 14, wherein sensor data used to generate the first and second measured values is converted from being dependent on time to being dependent on a physical characteristic of the wind turbine, wherein comparing the first measured value to the second measured value comprises:
    evaluating a difference value stored in a comparison table, wherein the difference value is generated by comparing the first measured value to the second measured value at a particular value of the physical characteristic.

17. The computer program product of claim 14, wherein the first measured value and second measured value are based on at least one of a force measured on the wind turbine or a physical characteristic of the first and second blades derived from updated sensor data.

18. The computer program product of claim 14, wherein the predetermined characterization is generated based on at least one of a manufacture's specification associated with the first blade and sensor data mined during a configuration stage of the wind turbine.

* * * * *